United States Patent
Krichevsky et al.

(10) Patent No.: US 8,891,341 B1
(45) Date of Patent: Nov. 18, 2014

(54) ENERGY ASSISTED MAGNETIC RECORDING DISK DRIVE USING MODULATED LASER LIGHT

(71) Applicant: Western Digital Technologies, Inc., Irvine, CA (US)

(72) Inventors: Alexander Krichevsky, San Jose, CA (US); Michael L. Mallary, Sterling, MA (US); Fenghua Zong, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/794,166

(22) Filed: Mar. 11, 2013

(51) Int. Cl.
*G11B 11/00* (2006.01)
*G11B 13/04* (2006.01)

(52) U.S. Cl.
CPC .................................... *G11B 13/04* (2013.01)
USPC .................................. 369/13.33; 369/13.13

(58) Field of Classification Search
CPC ...................... G11B 2005/0032; G11B 5/6088
USPC ............................................ 369/13.33, 13.13
See application file for complete search history.

(56) References Cited

U.S. PATENT DOCUMENTS

| | | | |
|---|---|---|---|
| 4,485,361 A | 11/1984 | Bender | |
| 5,065,226 A | 11/1991 | Kluitmans et al. | |
| 5,194,979 A | 3/1993 | Koai et al. | |
| 5,521,933 A | 5/1996 | Sosa | |
| 5,652,817 A * | 7/1997 | Brinkman et al. | 385/37 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |

(Continued)

OTHER PUBLICATIONS

Paul Meyer, "Pulse Testing of Laser Diodes", https://www.keithley.co.uk/com/applications/research/optoelectronics/focus/laserdiode, Publication Date: Unknown.

(Continued)

*Primary Examiner* — Tan X Dinh

(57) ABSTRACT

A method and system provide a heat assisted magnetic recording (HAMR) disk drive including a media. The HAMR disk drive also includes a slider, at least one laser, at least one HAMR head on the slider and at least one electro-optical modulator (EOM) optically coupled with the laser(s) and coupled with the slider. The at least one laser and the at least one EOM are coupled to provide a modulated energy output. The at least one EOM controls the modulated energy output to have a characteristic waveform shape. The at least one HAMR head includes at least one waveguide, a write pole, and at least one coil for energizing the write pole. The at least one waveguide receives the modulated energy output and directs the modulated energy output toward the media.

36 Claims, 10 Drawing Sheets

(56) References Cited

U.S. PATENT DOCUMENTS

| | | |
|---|---|---|
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,542,008 B1 | 4/2003 | Daugherty et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,801,240 B2 | 10/2004 | Abe et al. |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,941,080 B2 | 9/2005 | Kasper et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,989,550 B2 | 1/2006 | Nakahara et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |

(56) References Cited

U.S. PATENT DOCUMENTS

| | | |
|---|---|---|
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,558 B2 | 4/2006 | Tanbakuchi |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,130,100 B2 | 10/2006 | Kagaya et al. |
| 7,133,600 B1 | 11/2006 | Boyle |
| 7,136,244 B1 | 11/2006 | Rothberg |
| 7,136,328 B2 | 11/2006 | Miyaoka |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,317,665 B2 | 1/2008 | Watanabe et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,433,602 B2 | 10/2008 | Diaz |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,463,659 B2 | 12/2008 | Go et al. |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,538,978 B2 | 5/2009 | Sato et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | |
|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,131,158 B2 | 3/2012 | Tokita et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,248,732 B2 | 8/2012 | Nishiyama et al. |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,289,821 B1 | 10/2012 | Huber |
| 8,305,705 B1 | 11/2012 | Roohr |
| 8,305,869 B2 | 11/2012 | Kitayama et al. |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,315,128 B1 | 11/2012 | Wilson et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,385,752 B2 | 2/2013 | Tanaka |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,465 B1 | 6/2013 | Adachi et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,537,644 B2 | 9/2013 | Lennard et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2004/0105476 A1 | 6/2004 | Wasserbauer |
| 2004/0208207 A1 | 10/2004 | Kasper et al. |
| 2007/0206649 A1 | 9/2007 | Xu et al. |
| 2007/0230012 A1* | 10/2007 | Erden et al. ............ 360/75 |
| 2009/0113702 A1 | 5/2009 | Hogg |
| 2010/0306551 A1 | 12/2010 | Meyer et al. |
| 2011/0205861 A1 | 8/2011 | Erden et al. |
| 2011/0226729 A1 | 9/2011 | Hogg |
| 2012/0113770 A1 | 5/2012 | Stipe |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0128388 A1 | 5/2013 | Ajioka et al. |

OTHER PUBLICATIONS

U.S. Appl. No. 13/631,493, dated Sep. 28, 2012, to Alexander Krichevsky, et al., 33 pages.

U.S. Appl. No. 14/091,098, dated Nov. 26, 2013, to Alexander Krichevsky, et al., 17 pages.

U.S. Appl. No. 14/065,329, dated Oct. 28, 2013, to William D. Huber, 22 pages.

* cited by examiner

ENERGY ASSISTED MAGNETIC RECORDING DISK DRIVE USING MODULATED LASER LIGHT

BACKGROUND

FIG. 1 depicts a side view of portion of a conventional heat assisted magnetic recording (HAMR) disk drive 10. For clarity, FIG. 1 is not to scale. For simplicity not all portions of the HAMR disk drive 10 are shown. The HAMR disk drive 10 includes a HAMR head 11 including a slider 12 and a transducer 20. THE HAMR disk drive 10 also includes a laser/light source 14, media 18 and preamplifier and associated circuitry 30. The laser 14 is typically a laser diode. Although shown as mounted on the slider 11, the laser 14 may be coupled with the slider 11 in another fashion. For example, the laser 11 might be mounted on a suspension (not shown in FIG. 1) to which the slider 11 is also attached. The media 18 may include multiple layers, which are not shown in FIG. 1 for simplicity.

The HAMR head 11 includes a HAMR transducer 20. The HAMR head 11 may also include a read transducer (not shown in FIG. 1). The read transducer may be included if the HAMR head 11 is a merged head. The HAMR transducer 20 includes optical components (not shown in FIG. 1) as well as magnetic components (not shown in FIG. 1).

BRIEF SUMMARY OF THE INVENTION

A method and system to provide a heat assisted magnetic recording (HAMR) disk drive including a media are described. The HAMR disk drive also includes a slider, at least one laser, at least one HAMR head on the slider and at least one electro-optical modulator (EOM) optically coupled with the laser(s) and coupled with the slider. The at least one laser and the at least one EOM are coupled to provide a modulated energy output. The at least one EOM controls the modulated energy output to have a characteristic waveform shape. The at least one HAMR head includes at least one waveguide, a write pole, and at least one coil for energizing the write pole. The at least one waveguide receives the modulated energy output and directs the modulated energy output toward the media.

DETAILED DESCRIPTION OF THE EXEMPLARY EMBODIMENTS

Figure 1:
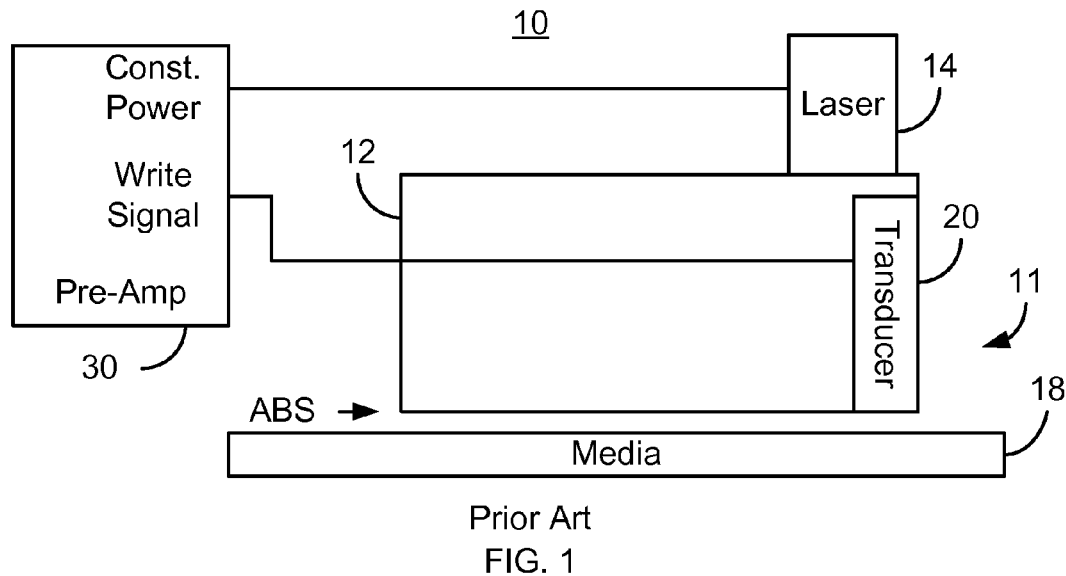
FIG. 1 depicts a side view of a conventional HAMR disk drive.

FIG. 1 also depicts a conventional pre-amplifier 30. The pre-amplifier 30 is typically located remote from the slider 12. For example, the pre-amplifier may reside on a flexible printed circuit board (actuator flex). The actuator flex provides mechanical and electrical connection between a system on a chip (SOC) including other electronics and the slider 12, which is typically mounted on the actuator flex. The conventional pre-amplifier 30 typically provides DC power for the conventional laser diode 14 and power for the transducer 20. For the transducer 20, the pre-amplifier 30 may be connected by two lines for a fly height sensor that helps determine the distance between the ABS and the media, one to two lines for a fly height control heater and ground, two lines for read data, and two lines for the write data.

In operation, the pre-amplifier 30 provides a constant power signal to the laser 14 during writing. Thus, the laser 14 remains on throughout the write operations. The laser 14 provides a constant source of energy, which is used to heat small regions of the media 18. The pre-amplifier 30 also provides write signals to the transducer 20. The write signals selectively energize one or more coils (not shown in FIG. 1). These coils energize a write pole (not shown in FIG. 1). The transducer 20 then magnetically writes to the media 18 in the heated region.

Although the conventional HAMR disk drive 10 functions, it is desirable to reduce power consumption of the HAMR disk drive 10. For example, a conventional near-field transducer (NFT) (not shown) is typically used to focus light from the conventional laser 14 onto the media 18. However, the conventional NFT is subject to overheating during use. The NFT may thus deform, melt, or corrode. Further, the lateral thermal gradient in the media 18 may be lower than desired. Stated differently, the temperature of the media 18 does not fall off sufficiently quickly in the cross track direction from the region being heated. Thus, the track widths recorded by the conventional HAMR transducer 20 may be wider than desired. Consequently, a mechanism for controlling the power consumed by the conventional HAMR disk drive 10 is desired.

Accordingly, what is needed are improved methods and systems for controlling power consumption in HAMR disk drives.

One mechanism for controlling power consumption in a HAMR disk drive is to modulate the current to a laser, such as the conventional laser 14. Thus, instead of providing DC power to the laser, the current is pulsed. Although this technology is promising, there are drawbacks. Circuitry for pulsing current to a laser at sufficiently high frequencies may be more expensive than is desired for disk drive technology. In addition, the pulsed current may introduce jitter into the output of the laser. The jitter is due to the random onset of the avalanche transition once the inverted population of excited/ground state electrons is achieved in the lasing media within the laser. This jitter may be mitigated by ensuring that the laser is operated above the threshold current at all times. However, the jitter may still be larger than desired for operation of the HAMR disk drive.

In addition, a more recently developed HAMR disk drive utilizes an electro absorption modulator (EAM) in connection with a laser to modulate the energy provided to the HAMR transducer. In particular, such a HAMR disk drive includes a media, at least one laser coupled with the slider, at least one HAMR head on the slider, and at least one EAM. The EAM(s) are optically coupled with the laser(s) and coupled with the slider. An EAM is a type of electro-optical modulator (EOM). The combination of the laser(s) and EOM(s) provide a toggled energy output. Stated differently, the EOM may simply function to alternately turn the energy output of the laser on and off. Such HAMR head(s) include at least one waveguide, a write pole, and at least one coil for energizing the write pole. The waveguide(s) receive the toggled energy output and direct the energy pulses toward the media. Although the pulsed laser output may be provided using the more recently developed system, further improvements may be desired.

Figure 2:
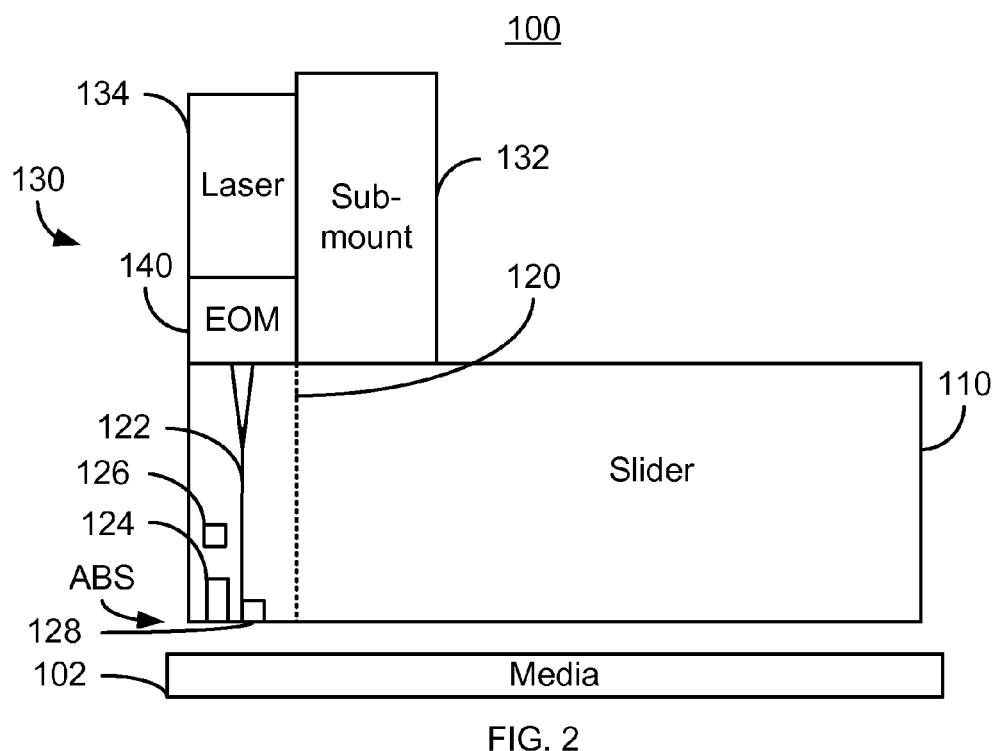
FIG. 2 depicts a side view of an exemplary embodiment of a portion of a HAMR disk drive that utilizes modulated laser light.

FIG. 2 depicts a side view of an exemplary embodiment of a portion of a HAMR disk drive 100 that may be operated using pulsed laser energy. For clarity, FIG. 2 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 120, 130 and 140 are shown. However, multiples of each components 102, 110, 120, 130 and/or 140 and their sub-components, might be used.

The HAMR disk drive 100 includes media 102, a slider 110, a HAMR head 120, a laser assembly 130 and an electro-optical modulator (EOM) 140. In some embodiments, the EOM is an EAM. The methods and systems are, therefore, described in the context of an EAM. However, in other embodiments, another type of EOM may be used. Additional and/or different components may be included in the HAMR disk drive 100. Although not shown, the slider 110, and thus the laser assembly 130 and HAMR transducer 120 are generally attached to a suspension (not shown). The HAMR transducer 120 is fabricated on the slider 110 and includes an air-bearing surface (ABS) proximate to the media 102 during use.

In general, the HAMR head 120 includes a write transducer and a read transducer. However, for clarity, only the write portion of the HAMR head 120 is shown. The HAMR head 120 includes a waveguide 122, write pole 124, coil(s) 126 and near-field transducer (NFT) 128. In other embodiments, different and/or additional components may be used in the HAMR head 120. The waveguide 122 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 2. In some embodiments, the laser 134 may be an edge emitting laser, a vertical surface emitting laser (VCSEL) or other laser. The laser 134 emits energy on a side/edge facing the waveguide 122.

The HAMR disk drive 100 also includes the EAM 140. In some embodiments, the EAM 140 may include a semiconductor or a multilayer having multiple quantum wells (MQW). In some embodiments, the EAM 140 is a Bragg EAM. The EAM 140 may be integrated onto the same chip as the laser 134 or may be a separate component. When integrated into the same chip as the laser 134 or affixed to the submount 132, the EAM 140 may be part of the laser assembly 130. In other embodiments, the EAM 140 may be integrated into the slider 110. In addition, the EAM 140 may take on a variety of configurations. The EAM 140 may also be small and inexpensive enough to be incorporated into the HAMR disk drive. In the embodiment shown in FIG. 2, the EAM 140 resides between the output of the laser 134 and the waveguide 122. To control operation of the EAM 140, and thus the energy output of the EAM 140-laser 134 combination, a controlled voltage is provided to the EAM 140 via pads (not shown). Depending upon the location of the EAM 140 and the specifics of the embodiment, these pads may be integrated into the laser assembly 130, onto the laser 134, and/or in the slider 110.

The combination of the laser 134 and the EAM 140 provide a modulated energy output to the waveguide 122. More specifically, the EAM 140 and laser 134 may be used to control the energy entering the waveguide not only to be pulsed, but also to have a characteristic waveform shape. For example, the pulsed/modulated output of the EAM 140 and laser 134 may include one or more of an impulse function, various types of square waves, various sawtooth waves, and sine wave(s), including one or more harmonics of a particular wave function. In some embodiments, the EAM 140 modulates the output of the laser 134 by controlling the introduction of charge carriers (e.g. electrons) into the region between the emission exit of the laser 134 and the waveguide 122. The electrons absorb light from the laser 134, which may alternately reduce (or eliminate) energy transmitted to the waveguide 122. As a result, the shape of the waveform for the energy entering the waveguide can be tailored. In other embodiments, such as an MQW EAM, the EAM 140 can alternately change is reflective properties. Thus, the reflection and transmission of light energy is controlled. Some or all of the light may be reflected back to the laser 134 or transmitted to the waveguide 122. In either embodiment, the output of the combination of the laser 134 and EAM 140 is pulsed energy having a desired waveform shape. In some embodiments, the EAM 140 may be capable of operating up to at least the 5-10 GHz range and may have a low insertion loss. The EAM 140 may also require a relatively low voltage and low current for operation. For example, the EAM 140 may operate in the 2-4 volt range. Thus, pulsed energy may be outputted to the waveguide 140 at frequencies of up to at least the 5-10 GHz range and having a particular waveform shape without requiring high voltages to be provided to the EAM 140. Such frequencies are generally considered sufficient for higher density recording.

In operation, the laser 134 emits light, which may be DC emission. The duty cycle of the laser 134 may also be controlled. Thus, the laser 134 need not be on continuously during operation. The laser light is modulated by the EAM 140 to provide modulated light to the waveguide 122. The waveguide 122 directs the modulated light to the NFT 128. The NFT 128 focuses the modulated light to a region of magnetic recording media 102 using surface plasmons. The NFT 128 thus couples the optical energy of the modulated light into the recording medium layer of the media 102 with a confined optical spot that is much smaller than the optical diffraction limit. This optical spot can typically heat the recording medium layer above the Curie point on the subnanosecond scale. High density bits can be written on a high coercivity medium with the pole 124 energized by the coils 126 to a modest magnetic field.

The HAMR disk drive 100 may have improved performance and reliability. Using the EAM 140, modulated laser energy may be provided to the waveguide 122 while operating the laser 134 in a DC mode. The laser 134 receives a DC current and provides a constant output that may be less subject to jitter. Further, the waveform shape for the modulated energy may be controlled by the EAM 140. Control over the waveform may allow the HAMR disk drive 100 to have further reduced temperature jitter of the media, an improved temperature versus time profile for the media, reduced heating of the NFT 128, better optimized power of the laser, and/or other desired features. Thus, the temperature of the media may be controlled by tailoring the shape of the pulses output by the laser 134 and EAM 140 combination. For example, harmonics such as the first and third harmonics of a square wave may be used to decrease jitter and provide a flatter temperature profile of the media to allow for more time for writing. The duty cycle of the laser 134 may be reduced using a sawtooth wave. The sawtooth may also lower the heating of the NFT and provide the highest peak media temperature. The lowest average laser power may be achieved using a square wave. Other goals may be achieved using these and/or other waveform shapes. Further, an improved gradient in the thermal spot size on the media 102 may be achieved, resulting in a narrower track width. Consequently, performance and reliability of the HAMR disk drive 100 may be improved.

Figure 3:
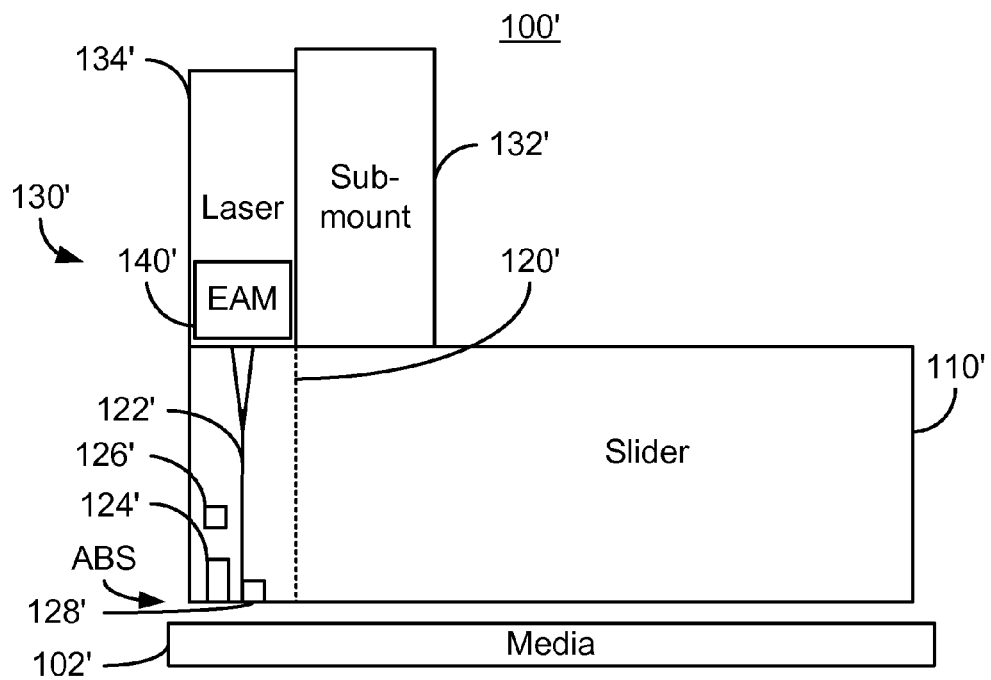
FIG. 3 depicts a side view of an exemplary embodiment of a portion of a HAMR disk drive that utilizes modulated laser light.

FIG. 3 depicts another exemplary embodiment of a portion of a HAMR disk drive 100' that utilizes modulated laser energy. FIG. 3 is not to scale. Although the HAMR disk drive 100' is depicted in the context of particular components additional, other and/or different components may be used. The HAMR disk drive 100' is analogous to the HAMR disk drive 100. Consequently, the HAMR disk drive 100' includes a media 102', a slider 110', a head 120', a laser assembly 130' and an EAM 140 that are analogous to the media 102, slider 110, HAMR head 120, laser assembly 130, and EAM 140, respectively. For clarity, only a portion of the HAMR disk drive 100' is shown.

The HAMR head 120' includes a waveguide 122', write pole 124', coil(s) 126' and NFT 128' that are analogous to the waveguide 122, write pole 124, coil(s) 126 and NFT 128, respectively. The structure and function of the waveguide 122', write pole 124', coil(s) 126' and NFT 128' are thus analogous to those of the waveguide 122, write pole 124, coil(s) 126 and NFT 128, respectively. The laser assembly 130' includes a submount 132' and a laser 134'. The submount 132' is analogous to the submount 132 and thus has a similar structure and function.

The laser 134' may be a chip such as a laser diode and may be analogous to the laser 134. Thus, the laser 134' includes at least a resonance cavity, a gain reflector on one end of the cavity, a partial reflector on the other end of the cavity and a gain medium. For simplicity, these components of the laser 134' are not shown in FIG. 3. In some embodiments, the laser 134' may be an edge emitting laser, a vertical cavity surface emitting laser (VCSEL) or other laser. The laser 134' emits energy on a side/edge facing the waveguide 122'.

The HAMR disk drive 100' also includes the EAM 140' that is analogous to the EAM 140. However, the EAM 140' is incorporated into the laser 134' rather than between the laser 134 and the waveguide 122 as is shown in FIG. 2. The EAM 140' thus resides within the cavity of the laser 134' and modulates the laser 134' itself. For example, the EAM 140' may reside within the cavity near the gain mirror. The EAM 140' may control the introduction and depletion of charge carriers (e.g. electrons) within the cavity of the laser 134'. The electrons absorb energy, which may control the gain for the laser 134', resulting in the laser 134' outputting pulses having the desired waveform shape. In other embodiments, the EAM 140' may alternately change its reflective properties to "spoil" the gain mirror. Again, the output of the laser 134' is modulated energy. In either embodiment, the EAM 140' and laser 134' may be controlled such that the gain media remains in an excited state between pulses. As a result, energy with the laser 134' may be considered to be conserved and power dissipated by the laser 134' reduced.

The HAMR disk drive 100' may have improved performance and reliability. Because the EAM 140' modulates the cavity of the laser 134', pulsed energy having the desired waveform is provided to the waveguide 134' and, therefore, to the NFT 128'. Thus, benefits such as a narrower track width, reduced heating of the NFT 128', an improved gradient in thermal spot size, reduced temperature jitter of the media 102', improved temporal profile of the media temperature, better optimized performance of the laser 134' and/or other features. Using the EAM 140', the cavity of the laser 134' is modulated to output pulsed laser energy provided to the waveguide 122. Because the cavity is modulated, the laser 134' may generate less power/heat as compared to DC operation. In addition, the depth of the modulation provided by the EAM 140' may be greater than that provided by the EAM 140. However, the laser 134' may be subject to jitter. Consequently, performance and reliability of the HAMR disk drive 100' may be enhanced.

Figure 4:
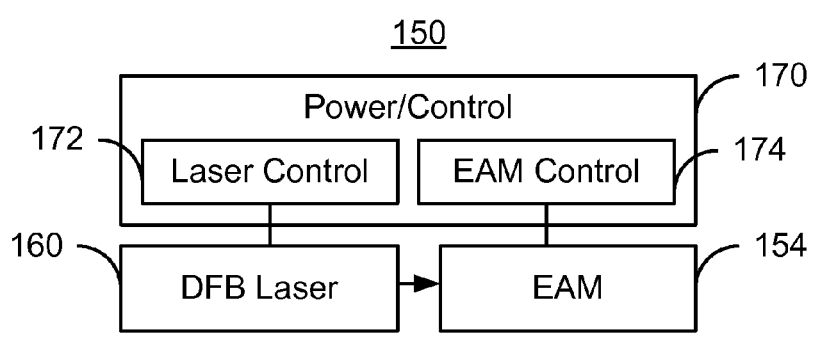
FIG. 4 depicts an exemplary embodiment of a portion of a HAMR disk drive including a laser and an electro-absorption modulator

FIG. 4 depicts an exemplary embodiment of a HAMR disk drive 150 analogous to the HAMR disk drives 100 and 100'. FIG. 4 is not to scale. Although the HAMR disk drive 150 is depicted in the context of particular components additional, other and/or different components may be used. For clarity, only a portion of the HAMR disk drive 150 is shown. In particular only the laser 160, EAM 154, and power/control unit 170 are shown. The laser 160 is analogous to the laser 134/134'. The HAMR disk drive 150 is analogous to the HAMR disk drives 100/100'. The EAM is thus analogous to the EAM 140/140' and resides between the output of the laser 160 and the waveguide (not shown). The EAM 154 may thus modulate the output of the laser 160 or the cavity of the laser 160.

The HAMR disk drive 150 includes the power/control block 170, which may be within a preamplifier. The power/control block 170 includes a laser control block 172 and an EAM control block 174. In another embodiment, the laser and EAM control may be combined into a single block. The power/control block 170 thus selectively energizes the laser 160 and EAM 154 to provide energy to the waveguide that is pulsed and has a desired temporal waveform.

The HAMR disk drive 100' may have improved performance and reliability. Using the power control block 170 the EAM 154 and laser 160 are controlled to provide a pulsed energy that has the desired shape. This pulsed energy output may be provided to a waveguide and NFT. Thus, the benefits of the HAMR disk drives 100 and 100' may also be attained in the HAMR disk drive 150. For example, a narrower track width, reduced heating of the NFT, an improved gradient in thermal spot size, reduced temperature jitter of the media, improved temporal profile of the media temperature, better optimized performance of the laser 160 and/or other features. Consequently, performance and reliability of the HAMR disk drive 150 may be enhanced.

Figure 5:
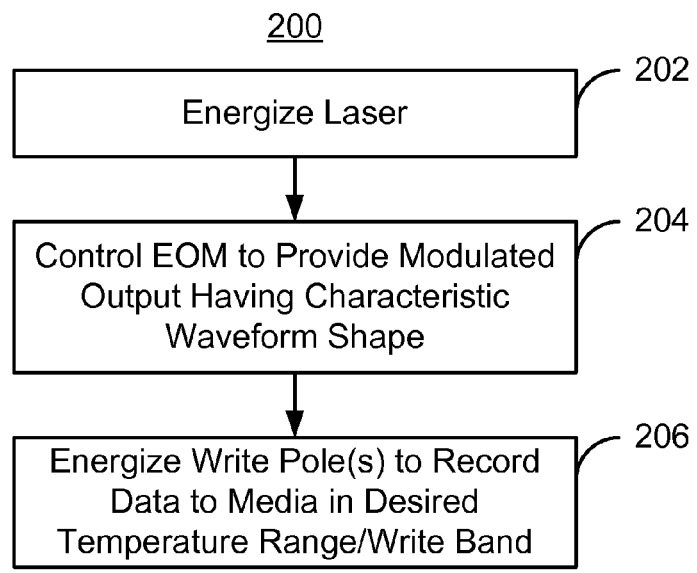
FIG. 5 is a flow chart depicting an exemplary embodiment of a method for writing using a HAMR disk drive including a laser and an electro-absorption modulator.

FIG. 5 depicts an exemplary embodiment of a method 200 of writing using a HAMR disk drive. For simplicity, some steps may be omitted, combined, replaced, performed in another sequence, and/or interleaved. The method 200 is described in the context of the HAMR disk drives 100/100'/150. However, the method 200 may be used for other HAMR disk drives. The method 200 is also described in a single EOM, laser, and transducer. However, the method 300 may be used to write multiple bits at substantially the same time and/or to use multiple EOMs, laser(s) and/or transducers at substantially the same time. Further, although the steps of the method 200 are depicted sequentially, one or more of the steps of the method 200 may overlap in time and/or occur at substantially the same time.

The laser 134/134'/160 is energized, via step 202. Step 202 may include providing current to the laser 134/134'/160, for example using power/control block 170 and laser control 172. The current provided to the laser 134/134'/160 in step 202 is sufficient to energize the laser 134/134'/160 to provide the desired energy output.

The EOM 140/140'/154 is controlled to provide a modulated energy output using the laser energy, via step 204. Step 204 may include modulating the power to the EAM 140/140'/154 using the power/control block 170 and EAM control 174. As a result, the energy provided to the waveguide 122/122' has the desired characteristic waveform shape. For example, the pulsed energy output could include one or more of an impulse function, a square wave, a square wave with leading edge overshoot, a square wave with a trailing edge overshoot, a sawtooth, an inverted sawtooth and a sine wave. Alternatively, step 204 might include simply toggling the pulsed output on or off. Such reduced control over the shape of the waveform may, for example, be used if specific peaks are used to determine the write band as discussed with respect to FIG. 8. The energy provided in step 204 is optically coupled into the waveguide 122/122' and provided from the waveguide 122/122' to the media 102/102'. In some embodiments, the modulated energy is provided to the media 102/102' using the NFT 128/128'.

The write pole 124/124' is selectively energized to record data to the media 102/102', via step 206. Step 206 may include writing when the media 102/102 is within a particular temperature range, or write band. In some embodiments, the temperature is desired to be above a particular temperature, termed the blocking temperature. The blocking temperature is a temperature above which the coercivity of the media begins to decrease. The Curie temperature is the temperature at which the coercivity of the media is near zero. The write band may include temperatures at and above the blocking temperature, but below the Curie temperature. In some embodiments, the write band is within a range of temperatures corresponding to peak media temperatures. Finally, although described as corresponding to a particular media temperature range, step 206 may include determining a time during which the write pole 124/124' is energized based upon the times at which the EAM 140/140'/154 and laser 134/134'/160 are energized. Thus, step 206 may include energizing the pole during the appropriate temperature and time range for recording. The steps of the method 200 may then be repeated for various locations on the media in order to write the desired data to the HAMR disk drive 100/100'/150.

Using the method 200, performance of the HAMR disk drives 100, 100', and/or 150 may be improved. For example, the write pole may be energized to write at a desired time and temperature of the media 102/102'. In at least some embodiments, the shape of the energy pulses provided to the media may be configured for desired outcomes including but not limited to reducing NFT heating, optimizing laser performance, reducing temperature jitter, controlling media temperature profile, and improved thermal gradient. Thus, performance and reliability of the HAMR disk drives 100, 100', and/or 150 may be enhanced.

Figure 6:
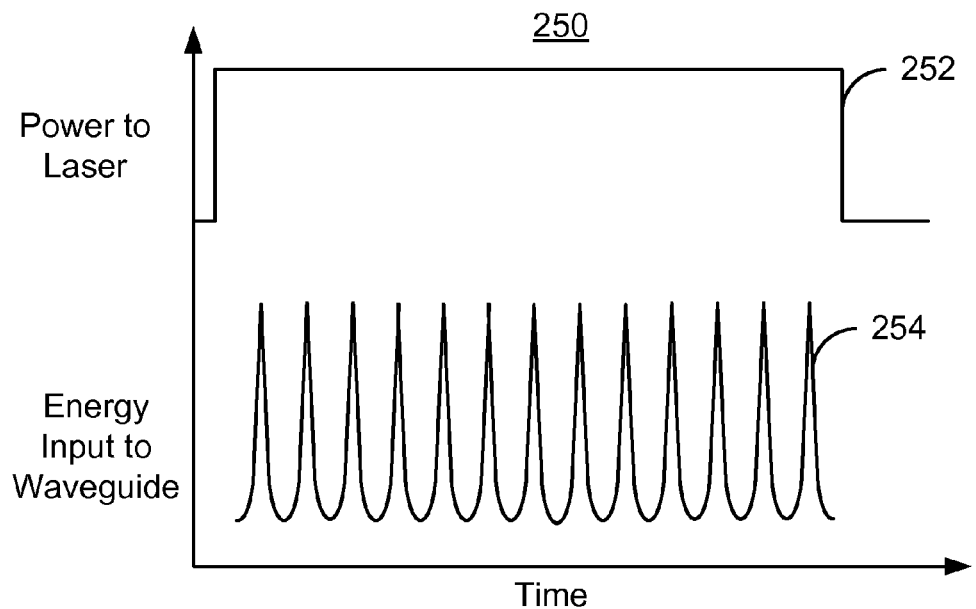
FIG. 6 is a graph depicting an exemplary embodiment of laser power and the optical energy output by the laser and an electro-absorption modulator combination.
Figure 7:
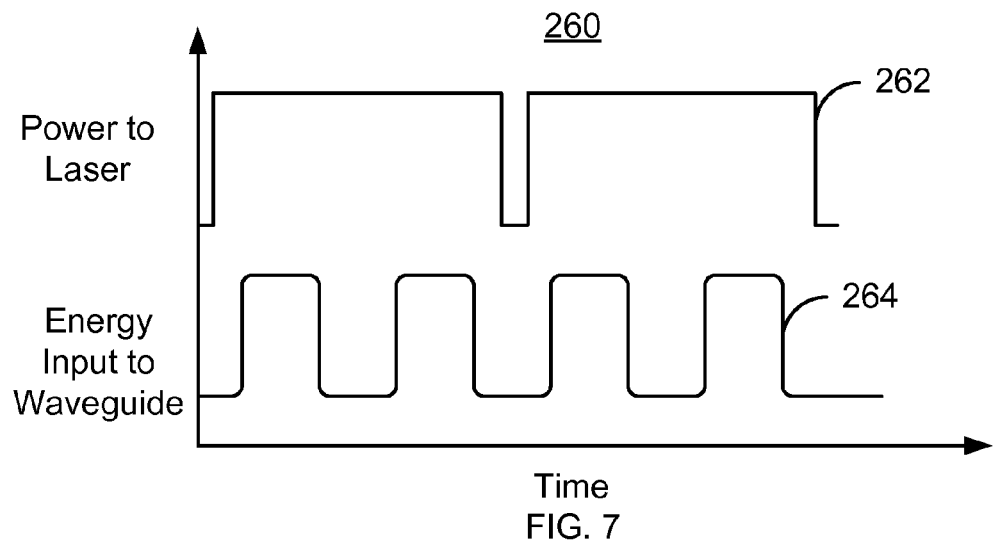
FIG. 7 is a graph depicting an exemplary embodiment of laser power and the optical energy output by the laser and an electro-absorption modulator combination.

FIGS. 6 and 7 are graphs 250 and 260, respectively, depicting exemplary embodiments of laser power and the optical energy output by the laser and EAM combination using the method 200. FIGS. 6 and 7 are described in the context of the method 200 and HAMR disk drives 100, 100' and 150. However, the graphs 250 and 260 may be obtained using other embodiments of the method and system not depicted herein. Although termed "graphs", "plots", "curves" or the like, the depictions in FIGS. 6 and 7 are for explanatory purposes only and not intended to depict data for a particular embodiment.

In the graph 250 of FIG. 6, DC current is provided to the laser 134/134'/160 during operation. This is shown by laser power plot 252. However, the EAM 140/140'/154 is controlled to modulate the energy provided to the waveguide 122/122'. Thus, although the laser 134/134'/160 operates in the DC regime, the energy input to the waveguide is a series of impulse functions. This is shown by the plot 254. Thus, the desired frequency and shape of the energy input to the waveguide 254 may be obtained.

In contrast, FIG. 7 depicts a graph 260 in which current to the laser is pulsed, as is shown in plot 262. The frequency of the laser pulses is, however, relatively low. In another embodiment, the laser 134/134'/160 might be pulsed at a frequency that is similar to that at which the EAM 140/140'/154 operates. In such embodiments, the period and waveform of the current driving of the laser 134/134'/160 may be selected to match that of the EAM 140/140'/154. The EAM 140/140'/154 is controlled to modulate the energy provided to the waveguide 122/122'. Thus, although the laser 134/134'/160 is on for relatively long periods, the energy input to the waveguide is a series of square waves having a higher frequency. This is shown by the plot 264. Both the waveform shape and the frequency of the energy input to the waveguide have been modified from that provided to the laser. Thus, the desired frequency and shape of the energy input to the waveguide 264 may be obtained. Thus, as is exemplified by the graphs 250 and 260, the laser 134/134'/140 and EAM 140/140'/154 may be separately controlled to provide to the waveguide 122/122' a modulated energy output having the desired shape and frequency. As a result, the benefits of the HAMR disk drives 100, 100', and 150 and the method 200 may be achieved.

Figure 8:
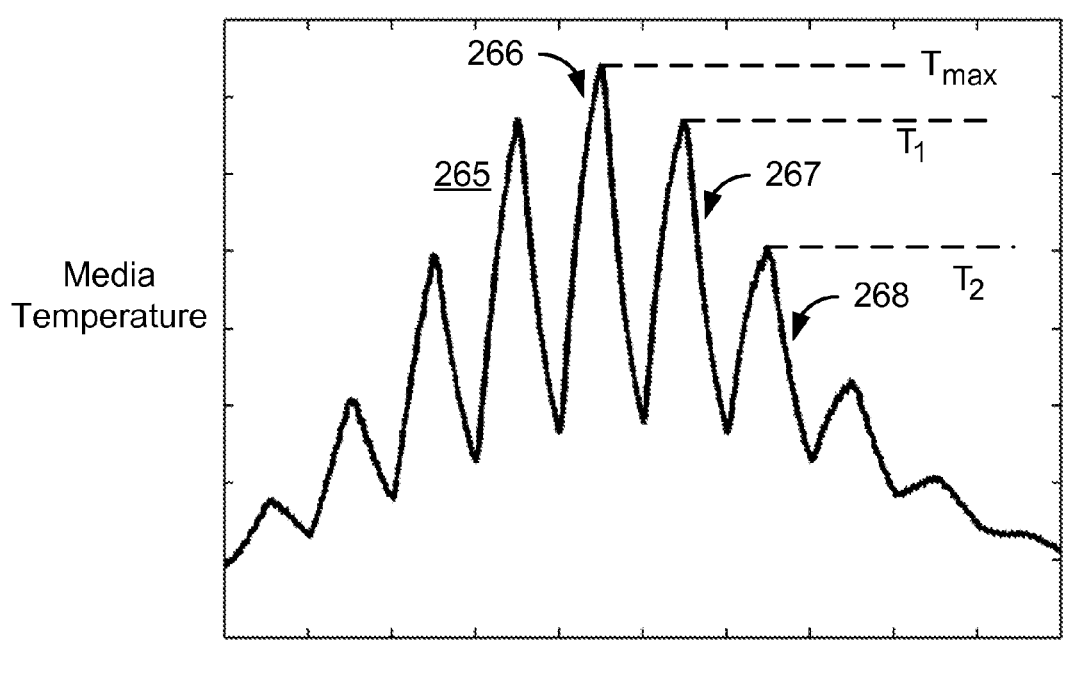
FIG. 8 is a graph depicting an exemplary embodiment of the temperature for a particular portion of the media versus time for a HAMR disk drive including a laser and an electro-absorption modulator.

FIG. 8 depicts an exemplary embodiment of a curve 265 of the temperature for a particular portion of the media versus time for a HAMR disk drive including a laser and an EOM. FIG. 8 is described in the context of the method 200 and HAMR disk drives 100, 100' and 150. However, the curve 265 may be obtained using other embodiments of the method and system not depicted herein. Although termed "graphs", "plots", "curves" or the like, the depiction in FIG. 8 is for explanatory purposes only and not intended to depict data for a particular embodiment.

The shape of the curve 265 reflects the change in temperature of the media 102/102' due to heating by the HAMR transducer 120/120'. As the slider 110/110' approaches the region, the temperature increases and reaches a maximum, $T_{max}$. As the slider 110/110' travels away from the region, the temperature of the region degreases. The curve 265 includes a number of peaks of which only peaks 266, 267 and 268 are labeled. The peaks correspond to pulses of energy of the laser and EAM combination. The peaks include a global maximum peak 266 at which the highest, global maximum temperature, $T_{max}$, occurs for the region. The adjoining local peak that occurs after the global maximum peak is peak 267 having a maximum temperature of $T_1$. The following local peak 268 has a lower maximum temperature of $T_2$. In general, it is desirable to write to the media after the maximum temperature $T_{max}$ has occurred. This aids in ensuring that data just written to the media is not inadvertently erased. In some embodiments, the write band is between $T_1$ and $T_{max}$—between the global maximum peak 266 and the adjoining local peak 267. In other embodiments, the write band is between $T_1$ and $T_2$—between the local peak 267 that adjoins the global maximum peak 266 and the next adjacent local peak 268. However, in other embodiments, other peaks and/or other combinations of peaks may be used.

By selecting the appropriate write band recording data in the HAMR disk drives 100, 100', 150 and/or other HAMR drives using pulsed energy may be improved. In particular, a sufficiently high media temperature to facilitate writing may be achieved without the data being inadvertently erased. Thus, performance of the HAMR drive(s) may be improved.

FIGS. 9-16 are graphs depicting exemplary embodiments of the laser power and media temperature versus time for a portion of HAMR disk drive(s) including laser(s) and electro-absorption modulator(s). FIGS. 9-16 are described in the context of the method 200 and HAMR disk drives 100, 100' and 150. However, the curves depicted may be obtained using other embodiments of the method and system not depicted herein. Although termed "graphs", "plots", "curves" or the like, the depictions in FIGS. 9-16 are for explanatory purposes only and not intended to depict data for a particular embodiment.

Figure 9:
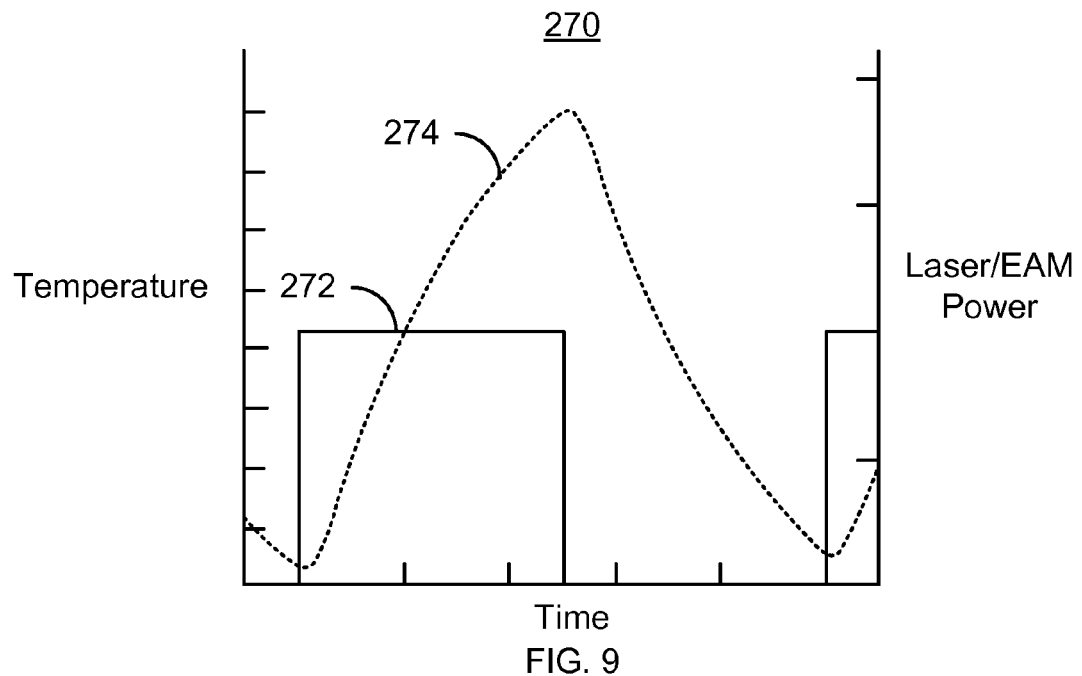
FIG. 9 includes graphs depicting an exemplary embodiment of the laser power and media temperature versus time for a portion of a HAMR disk drive including a laser and an electro-absorption modulator.

FIG. 9 depicts a graph 270 including curves 272 and 274. The curve 272 indicates the power provided by the combination of the laser 134/134'/160 and the EAM 140/140'/154. The dashed curve 274 depicts the one peak in the corresponding temperature profile for the media 102/102'. As can be seen in FIG. 9, the power provided by the laser and EAM combination is a square wave 272. The resulting temperature peak 274 is substantially triangular in shape.

Figure 10:
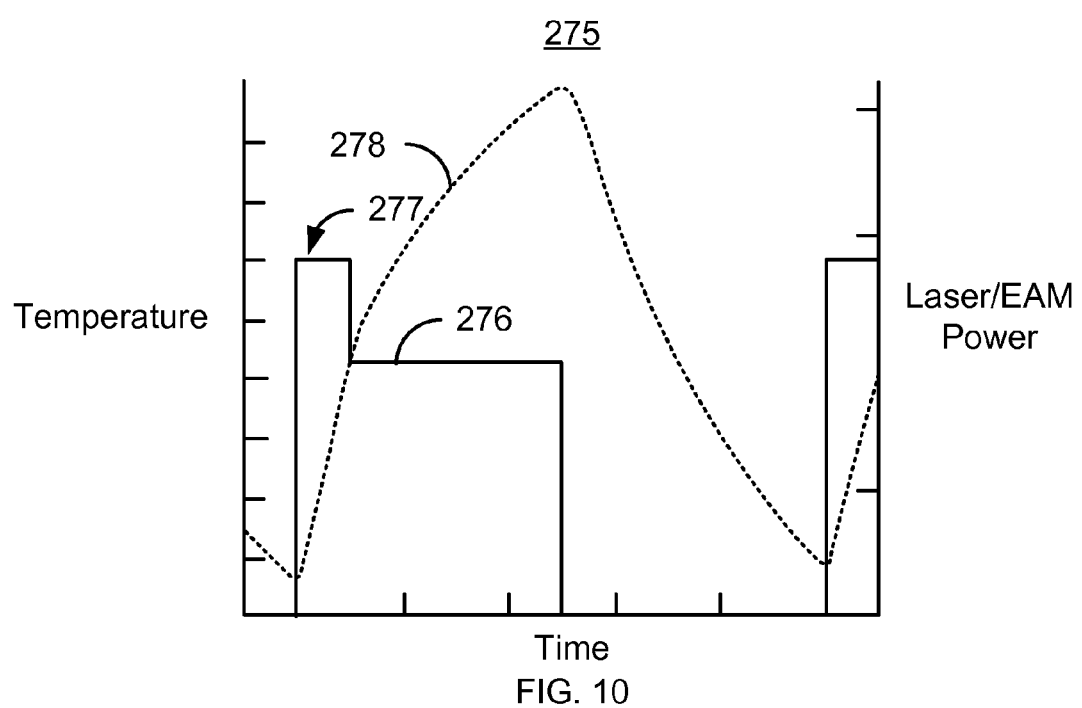
FIG. 10 includes graphs depicting another exemplary embodiment of the laser power and media temperature versus time for a portion of a HAMR disk drive including a laser and an electro-absorption modulator.

FIG. 10 depicts a graph 275 including curves 276 and 278. The curve 276 indicates the power provided by the combination of the laser 134/134'/160 and the EAM 140/140'/154. The dashed curve 278 depicts the one peak in the corresponding temperature profile for the media 102/102'. As can be seen in FIG. 10, the power provided by the laser and EAM combination is a square wave with a leading edge overshoot 277. The resulting temperature curve 278 is substantially triangular in shape.

Figure 11:
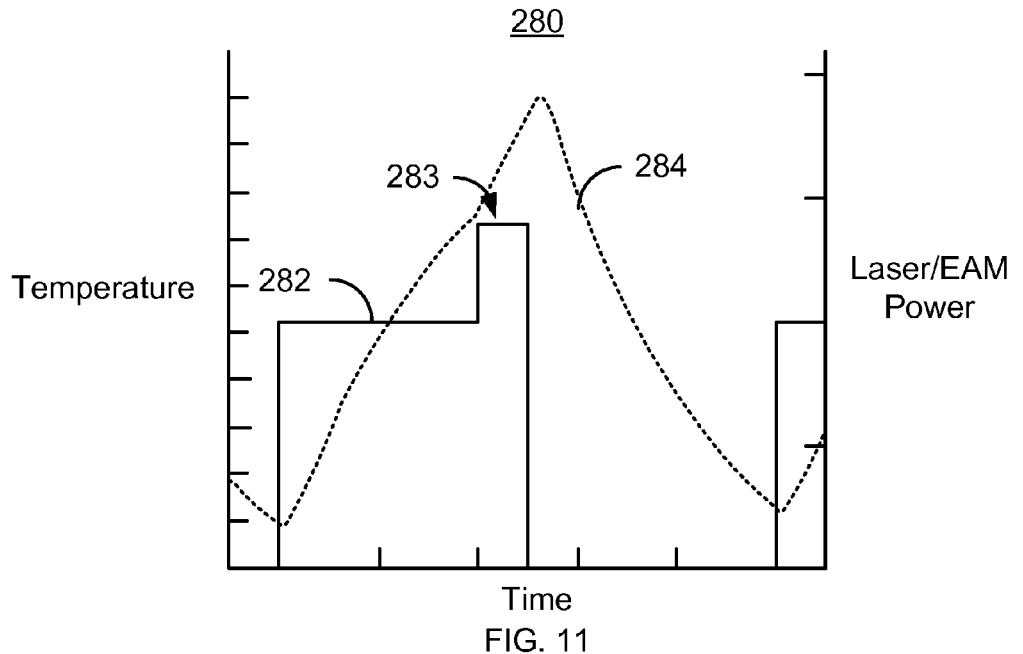
FIG. 11 includes graphs depicting another exemplary embodiment of the laser power and media temperature versus time for a portion of a HAMR disk drive including a laser and an electro-absorption modulator.

FIG. 11 depicts a graph 280 including curves 282 and 284. The curve 282 indicates the power provided by the combination of the laser 134/134'/160 and the EAM 140/140'/154. The dashed curve 284 depicts the one peak in the corresponding temperature profile for the media 102/102'. As can be seen in FIG. 11, the power provided by the laser and EAM combination is a square wave with a trailing edge overshoot 283. The resulting temperature curve 284 is substantially triangular in shape.

Figure 12:
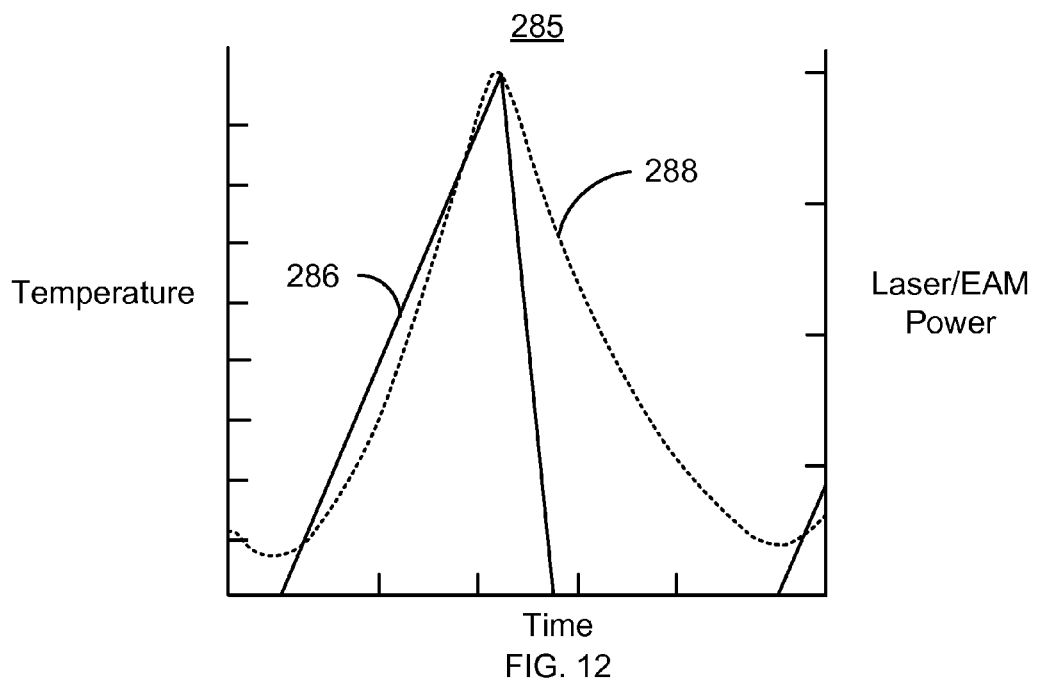
FIG. 12 includes graphs depicting another exemplary embodiment of the laser power and media temperature versus time for a portion of a HAMR disk drive including a laser and an electro-absorption modulator.

FIG. 12 depicts a graph 285 including curves 286 and 288. The curve 286 indicates the power provided by the combination of the laser 134/134'/160 and the EAM 140/140'/154. The dashed curve 288 depicts the one peak in the corresponding temperature profile for the media 102/102'. As can be seen in FIG. 12, the power provided by the laser and EAM combination is a sawtooth wave 276. The resulting temperature curve 288 is substantially triangular in shape with its peak temperature close in time to the peak power output by the combination of the laser 134/134'/160 and the EAM 140/140'/154.

Figure 13:
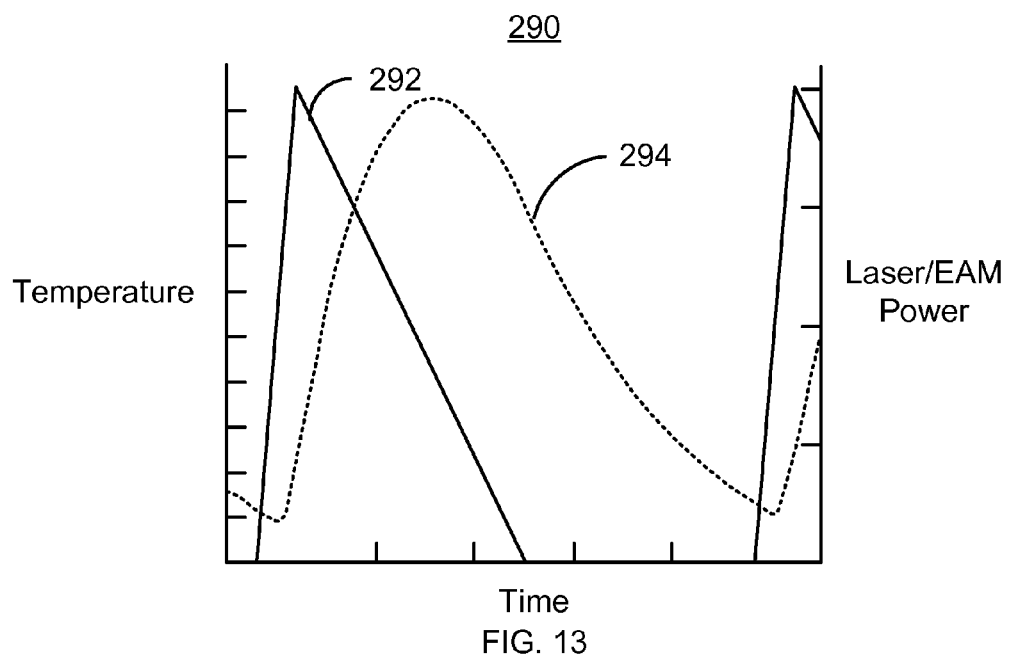
FIG. 13 includes graphs depicting another exemplary embodiment of the laser power and media temperature versus time for a portion of a HAMR disk drive including a laser and an electro-absorption modulator.

FIG. 13 depicts a graph 290 including curves 292 and 294. The curve 292 indicates the power provided by the combination of the laser 134/134'/160 and the EAM 140/140'/154. The dashed curve 294 depicts the one peak in the corresponding temperature profile for the media 102/102'. As can be seen in FIG. 13, the power provided by the laser and EAM combination is an inverted sawtooth wave 292. Thus, the leading edge substantially vertical. The resulting temperature curve 294 has a rounder shape.

Figure 14:
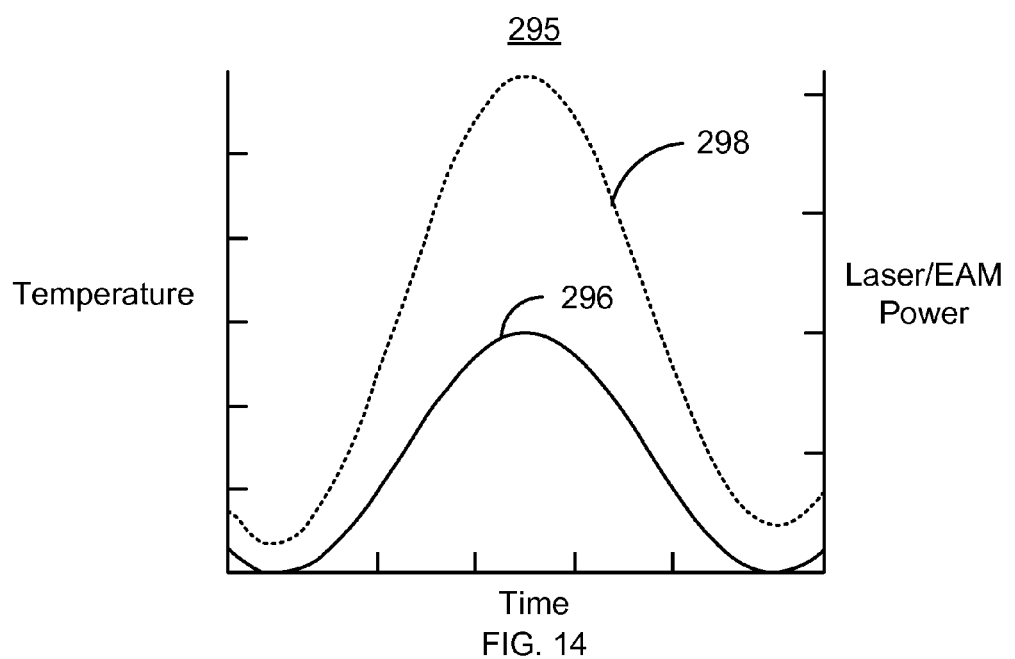
FIG. 14 includes graphs depicting another exemplary embodiment of the laser power and media temperature versus time for a portion of a HAMR disk drive including a laser and an electro-absorption modulator.

FIG. 14 depicts a graph 295 including curves 296 and 298. The curve 296 indicates the power provided by the combination of the laser 134/134'/160 and the EAM 140/140'/154. The dashed curve 298 depicts the one peak in the corresponding temperature profile for the media 102/102'. As can be seen in FIG. 14, the power provided by the laser and EAM combination is a sine wave 296. The resulting temperature curve 298 is similar to the sine wave 296 and has its peak temperature close in time to the peak power output by the combination of the laser 134/134'/160 and the EAM 140/140'/154.

Figure 15:
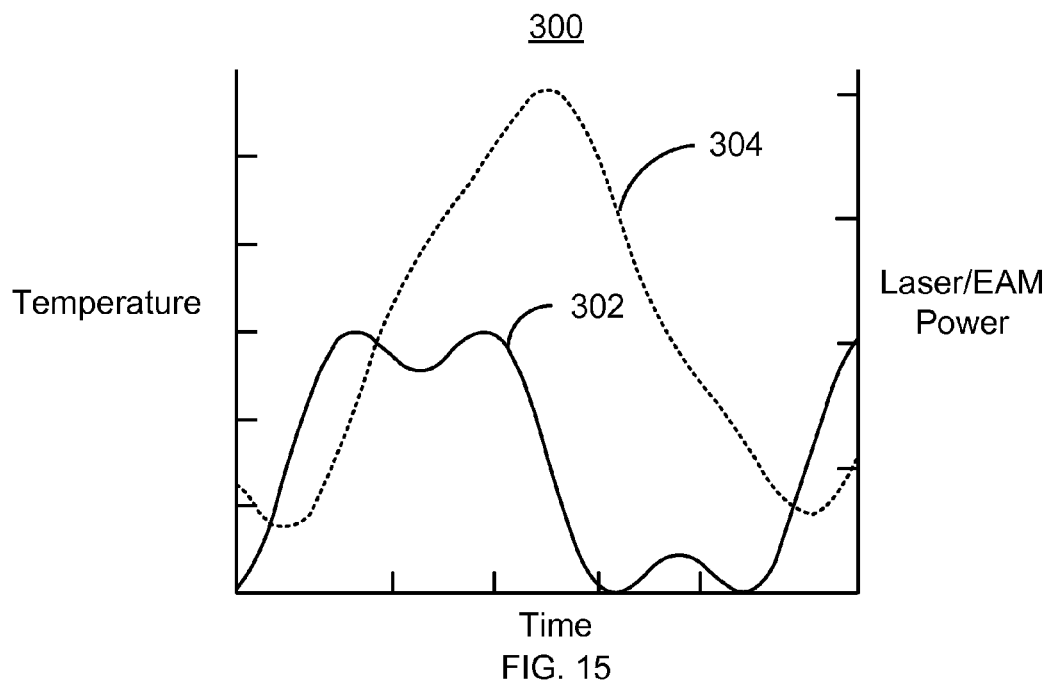
FIG. 15 includes graphs depicting another exemplary embodiment of the laser power and media temperature versus time for a portion of a HAMR disk drive including a laser and an electro-absorption modulator.

FIG. 15 depicts a graph 300 including curves 302 and 304. The curve 302 indicates the power provided by the combination of the laser 134/134'/160 and the EAM 140/140'/154. The dashed curve 304 depicts the one peak in the corresponding temperature profile for the media 102/102'. The power provided by the laser and EAM combination is a wave form 304 made from the first and third harmonics of a square wave. The resulting temperature curve 304 has a rounder shape.

Figure 16:
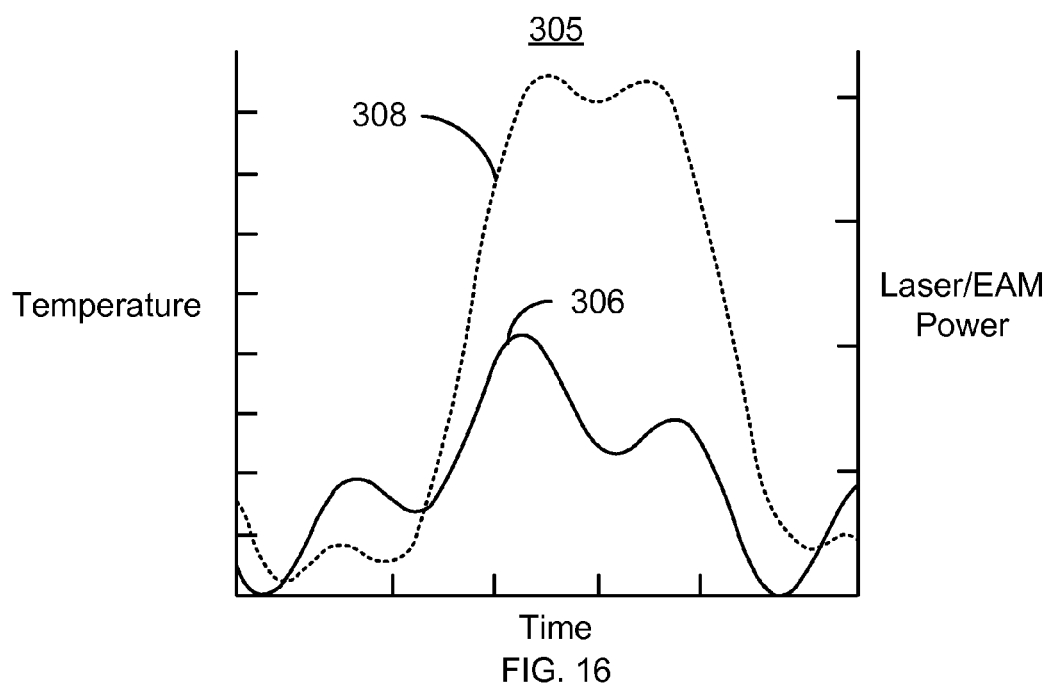
FIG. 16 includes graphs depicting another exemplary embodiment of the laser power and media temperature versus time for a portion of a HAMR disk drive including a laser and an electro-absorption modulator.

FIG. 16 depicts a graph 305 including curves 306 and 308. The curve 306 indicates the power provided by the combination of the laser 134/134'/160 and the EAM 140/140'/154. The dashed curve 308 depicts the one peak in the corresponding temperature profile for the media 102/102'. In the embodiment shown in FIG. 16, the power provided by the laser and EAM combination has a waveform 306 that is a combination of the first and third harmonics. However, the first and third harmonics have been configured to provide the curve 308 for the resulting temperature of the media 102/102'. In particular, the temperature curve 308 is more flat in the region of its peak temperature. This may facilitate writing using the HAMR disk drive 100, 100' and/or 150. It is also noted that the first and third harmonics may be further optimized and other and/or additional harmonics may be included. Thus, the desired temperature profile of the media 102/102' may be achieved.

As can be seen in FIGS. 9-16 the energy provided by the laser 134/134'/160 may be modulated using the EAM 140/140'/154 to achieve the desired shape of the pulses input to the waveguide 122/122'. In turn, the shape of the energy input to the waveguide 122/122' and provided to the media 102/102' may result in particular temperature versus time profiles for the media. Effects such as reduced temperature jitter, a flatter peaks in the temperature profile, desired peak temperatures, reduced heating of the NFT 128/128', optimized laser power and/or other effects may thus be achieved. Performance and reliability of the HAMR disk drive 100, 100', and/or 150 may thus be attained.

Figure 17:
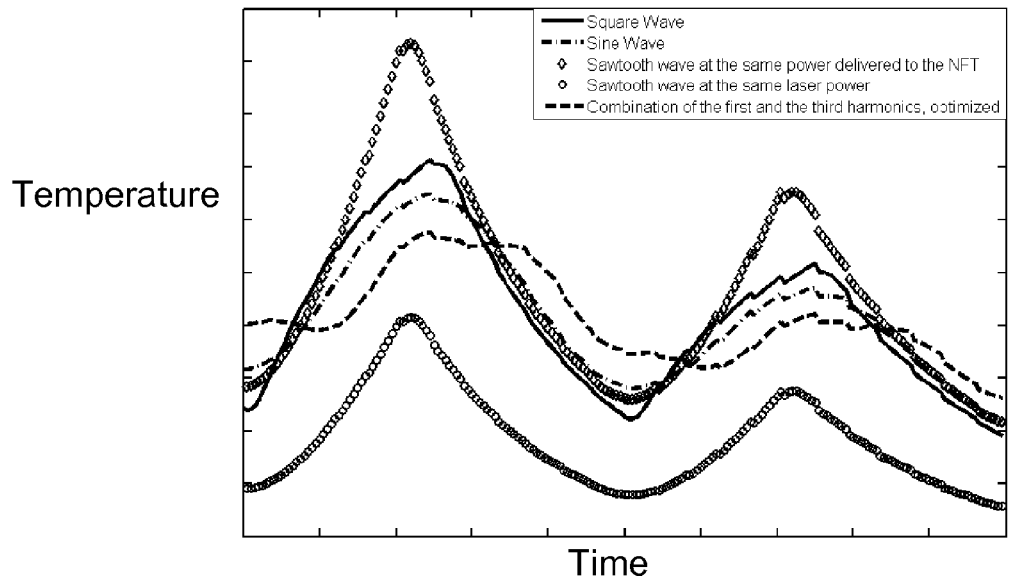
FIG. 17 includes graphs depicting exemplary embodiments of relative media temperature at the write peak and the next peak for the same average laser power in a HAMR disk drive including a laser and an electro-absorption modulator.
Figure 18:
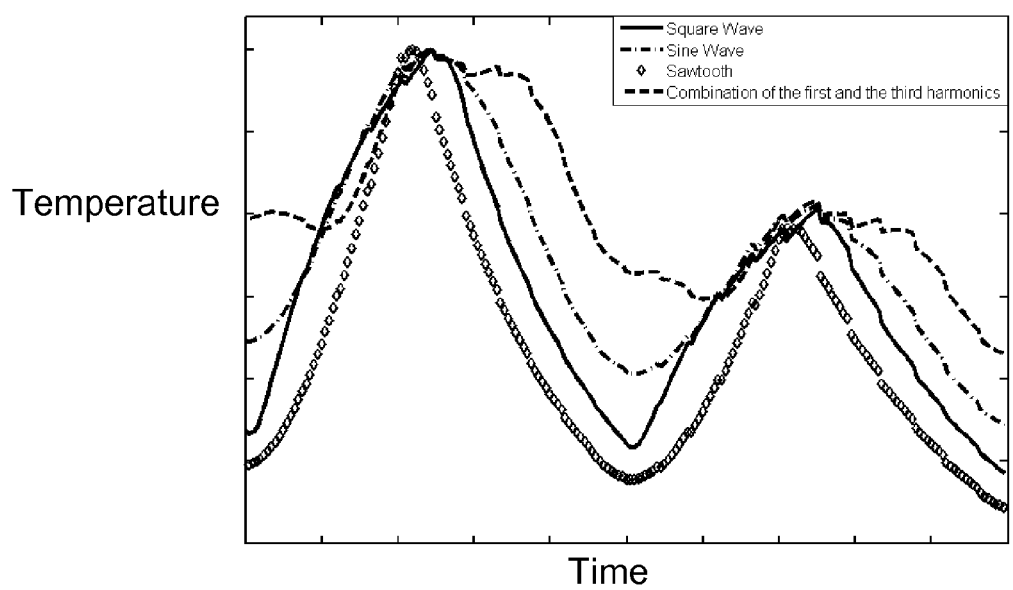
FIG. 18 includes graphs depicting exemplary embodiments of media temperature at the write peak and the next peak for the same writing peak temperature in a HAMR disk drive including a laser and an electro-absorption modulator.

FIG. 17 is a graph 310 including curves depicting exemplary embodiments of relative media temperature at the write peak and the next peak for the same average laser power in a HAMR disk drive including a laser and electro-absorption modulator. FIG. 18 is a graph 320 including curves depicting exemplary embodiments of media temperature at the write peak and the next peak for the same writing peak temperature in a HAMR disk drive including a laser and electro-absorption modulator. FIGS. 17-18 are described in the context of the method 200 and HAMR disk drives 100, 100' and 150. However, the curves depicted may be obtained using other embodiments of the method and system not depicted herein. Although termed "graphs", "plots", "curves" or the like, the depictions in FIGS. 17-18 are for explanatory purposes only and not intended to depict data for a particular embodiment.

As can be seen in the graph 310, the sawtooth shape for the wave function provides the highest peak temperature. However, the sawtooth waveform alone may have other disadvantages, such as a higher power level than other wave forms. Thus, the shape of the waveform provided by the combination of the laser 134/134'/160 and the EAM 140/140'/154 may be different from the waveforms described herein. The graph 320 indicates that despite differences in the shapes of the curves, the position of the peaks versus time is relatively similar. Thus, the time at which the write pole 124/124' may be determined for different waveforms.

Figure 19:
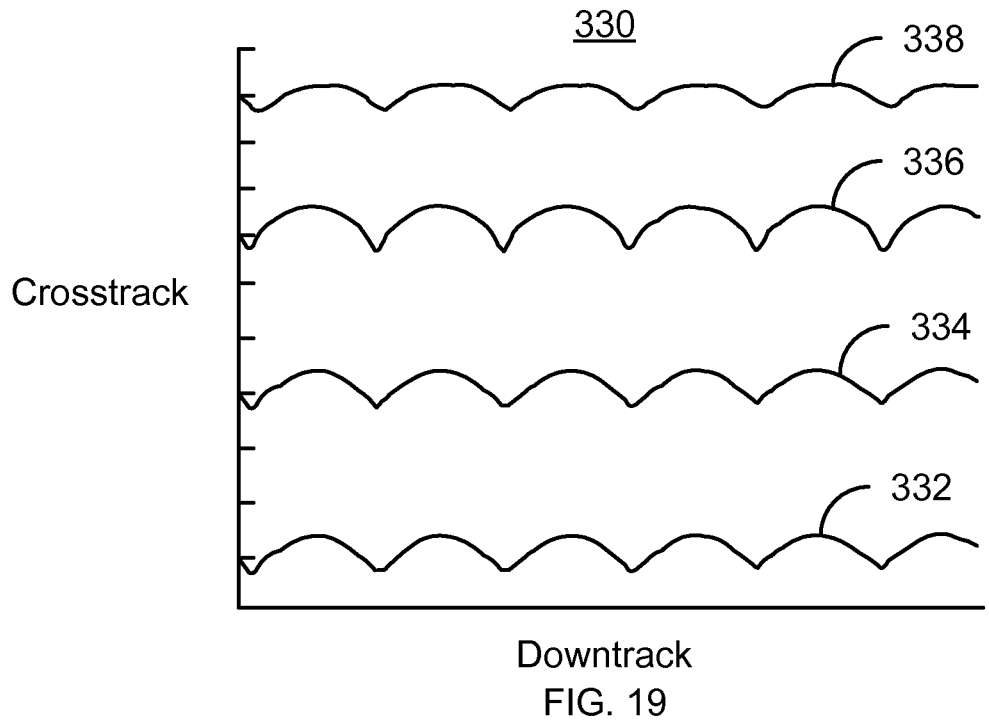
FIG. 19 includes graphs depicting another exemplary embodiment of the temperature variation for a portion of HAMR disk drives including a laser and an electro-absorption modulator.

FIG. 19 is a graph 330 depicting another exemplary embodiment of the temperature variation for a portion of HAMR disk drives including a laser and electro-absorption modulator. FIG. 19 is described in the context of the method 200 and HAMR disk drives 100, 100' and 150. However, the curves depicted may be obtained using other embodiments of the method and system not depicted herein. Although termed "graphs", "plots", "curves" or the like, the depictions in FIG. 19 are for explanatory purposes only and not intended to depict data for a particular embodiment.

The graph 330 includes curves 332, 334, 336 and 338 that correspond to different shapes of the waveform for the energy provided by the laser 134/134'/160 and EAM 140/140'/154 combination. The curves 332, 334, 336 and 338 correspond to the maximum temperature variation in the media 102/102' along the track for a square wave, a sine wave, a sawtooth wave and a combination of the first and third harmonics of a square wave, respectively. As can be seen in FIG. 19, the amplitude of the curve 338 is smallest, indicating that the first and third harmonics may result in reduced temperature jitter of the media 102/102'. However, as described above, other considerations may be taken into account in selecting the shape of the waveform for the energy provided to the waveguide 122/122'. Thus, the first and third harmonics may or may not be used in particular embodiments of the method and system described herein.

Figure 20:
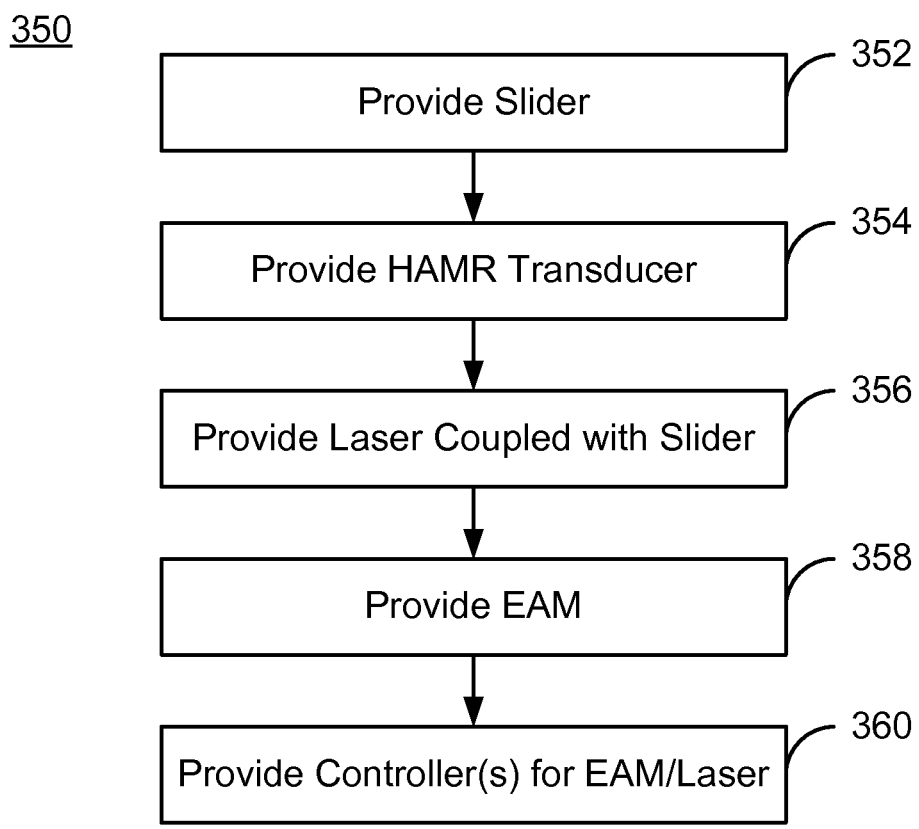
FIG. 20 is a flow chart depicting an exemplary embodiment of a method for fabricating a HAMR disk drive including a laser and an electro-absorption modulator.

FIG. 20 is a flow chart depicting an exemplary embodiment of a method 350 for fabricating a HAMR disk drive including a laser and electro-absorption modulator. For simplicity, some steps may be omitted, combined, replaced, performed in another sequence, and/or interleaved. The method 350 is described in the context of the HAMR disk drives 100/100'/150. However, the method 350 may be used for other HAMR disk drives. The method 350 also may commence after formation of some portions of the HAMR disk drive 100/100'/150. The method 350 is also described in the context of providing a single disk drive. However, the method 350 may be used to fabricate multiple disk drives at substantially the same time.

A slider 110/110' is provided, via step 352. The HAMR head 120/120' is provided on the slider 110/110', via step 354. Step 354 includes fabricating the structures for the HAMR head such as the waveguide 122/122', the write pole 124/124', the coil(s) 126/126' and the NFT 128/128'. In other embodiments, other or different components may be fabricated as part of step 304. The laser 134/134' is also provided, via step 356. Step 356 may include obtaining the desired laser 134/134' and affixing the laser to the submount 132/132'. Thus, the laser provided in step 356 may be an edge emitting laser, a VCSEL or other laser.

One or more EAM(s) 140/140' optically coupled with the laser 134/134' and with coupled with the slider 110/110' are provided, via step 358. Step 358 may include integrating the EAM 140' within the laser 134'. Alternatively, the EAM 140 may be located between the output of the laser 134 and the waveguide 122. The power/control block 170 for the EAM 140/140'/154 and laser 134/134'/160 is provided in step 360 Step 360 may also include coupling the power/control block with the EAM 140 and laser 134.

Thus, using the method 350, the disk drives 100/100'/150 may be provided. These disk drives 100/100'/150 may be used in conjunction with the method 200. As a result, the benefits of the disk drives 100/100'/10 and method 200 may be achieved.

We claim:

1. A heat assisted magnetic recording (HAMR) disk drive including a media comprising:
   a slider;
   at least one laser coupled with the slider;

at least one electro-optical modulator (EOM) optically coupled with the at least one laser and coupled with the slider, the at least one laser and the at least one EOM being coupled to provide a modulated energy output, the at least one EOM controlling the modulated energy output to be a pulsed output having a characteristic waveform shape for energy versus time; and at least one HAMR head on the slider, the at least one HAMR head including at least one waveguide, a write pole, and at least one coil for energizing the write pole, the at least one waveguide for receiving the modulated energy output and directing the modulated energy output toward the media.

2. The HAMR disk drive of claim 1 wherein the EOM is an electro-absorption modulator.

3. The HAMR disk drive of claim 1 wherein the characteristic waveform is at least one of an impulse function, a square wave, a square wave with leading edge overshoot, a square wave with a trailing edge overshoot, a sawtooth, an inverted sawtooth and at least one sine wave.

4. The HAMR disk drive of claim 1 wherein the characteristic waveform includes at least one harmonic of a periodic wave.

5. The HAMR disk drive of claim 4 wherein the at least one harmonic includes a first harmonic and a third harmonic.

6. The HAMR disk drive of claim 5 wherein the periodic wave is a square wave.

7. The HAMR disk drive of claim 1 wherein the characteristic waveform includes at least one impulse function.

8. A heat assisted magnetic recording (HAMR) disk drive including a media comprising:

a slider;

at least one laser coupled with the slider;

at least one electro-optical modulator (EOM) optically coupled with the at least one laser and coupled with the slider, the at least one laser and the at least one EOM being coupled to provide a modulated energy output, the at least one EOM controlling the modulated energy output to have a characteristic waveform shape; and at least one HAMR head on the slider, the at least one HAMR head including at least one waveguide, a write pole, and at least one coil for energizing the write pole, the at least one waveguide for receiving the modulated energy output and directing the modulated energy output toward the media;

wherein the media experiences a time varying temperature based on the modulated energy output, the time varying temperature having a global peak and a plurality of local peaks, the HAMR head being configured to write to the media in a write band corresponding to a time range and a temperature range between two of the plurality of local peaks.

9. A heat assisted magnetic recording (HAMR) disk drive including a media comprising:

a slider;

at least one laser coupled with the slider;

at least one electro-optical modulator (EOM) optically coupled with the at least one laser and coupled with the slider, the at least one laser and the at least one EOM being coupled to provide a modulated energy output, the at least one EOM controlling the modulated energy output to have a characteristic waveform shape; and at least one HAMR head on the slider, the at least one HAMR head including at least one waveguide, a write pole, and at least one coil for energizing the write pole, the at least one waveguide for receiving the modulated energy output and directing the modulated energy output toward the media;

wherein the media experiences a time varying temperature based on the modulated energy output, the time varying temperature having a global peak, a first local peak having a first local maximum, a second local peak having a second local maximum, the first local peak adjoining the global and the second local peak adjoining the first local peak, the HAMR head being configured to write to the media in a write band corresponding to a time range and a temperature range between the first local peak and the second local peak.

10. The HAMR disk drive of claim 9 wherein the first local peak occurs after the global and the second local peak occurs after the first local peak.

11. A heat assisted magnetic recording (HAMR) disk drive including a media comprising:

a slider;

at least one laser coupled with the slider;

at least one electro-optical modulator (EOM) optically coupled with the at least one laser and coupled with the slider, the at least one laser and the at least one EOM being coupled to provide a modulated energy output, the at least one EOM controlling the modulated energy output to have a characteristic waveform shape; and at least one HAMR head on the slider, the at least one HAMR head including at least one waveguide, a write pole, and at least one coil for energizing the write pole, the at least one waveguide for receiving the modulated energy output and directing the modulated energy output toward the media;

wherein the media experiences a time varying temperature based on the modulated energy output, the time varying temperature having a global peak and a plurality of local peaks, the HAMR head being configured to write to the media in a write band corresponding to a time range and a temperature range after the global peak and between the global peak and one of the plurality of local peaks.

12. The HAMR disk drive of claim 1 wherein the HAMR head further includes:

at least one near-field transducer (NFT) coupled with the at least one waveguide, the characteristic waveform shape being configured to minimize average heating of the at least one NFT.

13. The HAMR disk drive of claim 12 wherein the characteristic waveform shape is at least one of a sawtooth and an inverted sawtooth.

14. The HAMR disk drive of claim 1 wherein the characteristic waveform shape is configured to optimize a temperature of the media.

15. The HAMR disk drive of claim 1 wherein the characteristic waveform shape is configured to optimize a power of the laser.

16. The HAMR disk drive of claim 14 wherein the characteristic waveform shape is a square wave.

17. The HAMR disk drive of claim 1 wherein the characteristic waveform shape is configured to optimize temperature jitter of the media.

18. The HAMR disk drive of claim 1 wherein the characteristic waveform shape includes a plurality of harmonics of a square wave.

19. A method for fabricating a heat assisted magnetic recording (HAMR) disk drive including a media comprising:

providing a slider;

providing at least one laser coupled with the slider;

providing at least one electro-optical modulator (EOM) optically coupled with the at least one laser and coupled with the slider, the at least one laser and the at least one EOM being coupled to a modulated energy output, the at least one EOM controlling the modulated energy output to be a pulsed output having a characteristic waveform shape for energy versus time; and providing at least one HAMR head on the slider, the at least one HAMR head including at least one waveguide, a write pole, and at least one coil for energizing the write pole, the at least one waveguide for receiving the modulated energy output and directing the modulated energy output toward the media.

20. The method of claim 19 wherein the characteristic waveform is at least one of a square wave, a square wave with leading edge overshoot, a square wave with a trailing edge overshoot, a sawtooth, an inverted sawtooth and a sine wave.

21. The method of claim 19 wherein the media experiences a time varying temperature based on the modulated energy output, the time varying temperature having a global peak and a plurality of local peaks, the HAMR head being configured to write to the media in a write band corresponding to a time range and a temperature range between two of the plurality of local peaks.

22. The method of claim 19 wherein the media experiences a time varying temperature based on the modulated energy output, the time varying temperature having a maximum peak, a first local peak having a first local maximum, a second local peak having a second local maximum, the first local peak adjoining the maximum and the second local peak adjoining the first local peak, the HAMR head being configured to write to the media in a write band corresponding to a time range and a temperature range between the first local peak and the second local peak.

23. The method of claim 19 wherein the media experiences a time varying temperature based on the modulated energy output, the time varying temperature having a global peak and a plurality of local peaks, the HAMR head being configured to write to the media in a write band corresponding to a time range and a temperature range after the global peak and between the global peak and one of the plurality of local peaks.

24. The method of claim 19 wherein the step of providing the HAMR head further includes:
providing at least one near-field transducer (NFT) coupled with the at least one waveguide, the characteristic waveform shape being configured to minimize average heating of the at least one NFT.

25. A method for writing to a media in a heat assisted magnetic recording (HAMR) disk drive, the HAMR disk drive including at least one laser and at least one HAMR head having at least one waveguide and at least one write pole therein, the method comprising:
energizing the laser to provide energy;
controlling at least one electro-optical modulator (EOM) optically coupled with the at least one laser to provide a modulated energy output using the energy, the at least one EOM controlling the modulated energy output to be a pulsed output having a characteristic waveform shape for energy versus time, the modulated energy being optically coupled into the at least one waveguide and being provided from the waveguide to the media; and
energizing the at least one write pole to record data to the media when the media has at least a particular temperature.

26. The method of claim 25 wherein the characteristic waveform is at least one of an impulse function, a square wave, a square wave with leading edge overshoot, a square wave with a trailing edge overshoot, a sawtooth, an inverted sawtooth and a sine wave.

27. The method of claim 25 wherein the characteristic waveform includes at least one harmonic of a periodic wave.

28. The method of claim 25 wherein the at least one harmonic includes a first harmonic and a third harmonic.

29. The method of claim 28 wherein the periodic wave is a square wave.

30. The method of claim 25 wherein the characteristic waveform includes at least one impulse function.

31. A method for writing to a media in a heat assisted magnetic recording (HAMR) disk drive, the HAMR disk drive including at least one laser and at least one HAMR head having at least one waveguide and at least one write pole therein, the method comprising:
energizing the laser to provide energy;
controlling at least one electro-optical modulator (EOM) optically coupled with the at least one laser to provide a modulated energy output using the energy, the at least one EOM controlling the modulated energy output to have a characteristic waveform shape, the modulated energy being optically coupled into the at least one waveguide and being provided from the waveguide to the media; and
energizing the at least one write pole to record data to the media when the media has at least a particular temperature;
wherein the media experiences a time varying temperature based on the modulated energy output, the time varying temperature having a global peak and a plurality of local peaks and wherein the step of energizing the at least one write pole further includes:
writing to the media in a write band corresponding to a time range and a temperature range between two of the plurality of local peaks.

32. A method for writing to a media in a heat assisted magnetic recording (HAMR) disk drive, the HAMR disk drive including at least one laser and at least one HAMR head having at least one waveguide and at least one write pole therein, the method comprising:
energizing the laser to provide energy;
controlling at least one electro-optical modulator (EOM) optically coupled with the at least one laser to provide a modulated energy output using the energy, the at least one EOM controlling the modulated energy output to have a characteristic waveform shape, the modulated energy being optically coupled into the at least one waveguide and being provided from the waveguide to the media; and
energizing the at least one write pole to record data to the media when the media has at least a particular temperature
wherein the media experiences a time varying temperature based on the modulated energy output, the time varying temperature having a maximum peak, a first local peak having a first local maximum, a second local peak having a second local maximum, the first local peak adjoining the maximum and the second local peak adjoining the first local peak and wherein the step of energizing the at least one write pole further includes:
writing to the media in a write band corresponding to a time range and a temperature range between the first local peak and the second local peak.

33. The method of claim 32 wherein the first local peak occurs after the maximum and the second local peak occurs after the first local peak.

34. The method of claim 25 wherein the characteristic waveform shape is configured to optimize a temperature of the media.

35. The method of claim 25 wherein the characteristic waveform shape is configured to optimize a power of the laser.

36. The method of claim 25 wherein the characteristic waveform shape is configured to optimize temperature jitter of the media.

* * * * *